United States Patent
Thai et al.

(10) Patent No.: US 8,312,530 B2
(45) Date of Patent: Nov. 13, 2012

(54) SYSTEM AND METHOD FOR PROVIDING SECURITY IN A NETWORK ENVIRONMENT USING ACCOUNTING INFORMATION

(75) Inventors: Hien T. Thai, Elk Grove, CA (US); Kevin D. Shatzkamer, New York, NY (US); Andrew G. Gasson, Madrid (ES); Laurent Andriantsiferana, Valbone (FR); Eric Hamel, Paris (FR); Jayaraman R. Iyer, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1233 days.

(21) Appl. No.: 11/420,186

(22) Filed: May 24, 2006

(65) Prior Publication Data

US 2007/0192846 A1 Aug. 16, 2007

Related U.S. Application Data

(63) Continuation-in-part of application No. 10/890,450, filed on Jul. 12, 2004.

(51) Int. Cl.
*G06F 9/00* (2006.01)
*G06F 15/16* (2006.01)
*G06F 17/00* (2006.01)

(52) U.S. Cl. .......... 726/12; 726/1; 726/2; 726/3; 726/6; 709/228; 709/229

(58) Field of Classification Search ............... 726/1, 2, 726/3, 12, 16, 6; 709/228–229
See application file for complete search history.

(56) References Cited

U.S. PATENT DOCUMENTS

| | | | |
|---|---|---|---|
| 4,857,912 A | 8/1989 | Everett, Jr. et al. | 340/825.3 |
| 5,511,122 A | 4/1996 | Atkinson | 380/25 |
| 5,805,803 A * | 9/1998 | Birrell et al. | 726/12 |
| 5,892,903 A | 4/1999 | Klaus | 395/187.01 |
| 5,937,159 A | 8/1999 | Meyers et al. | 395/187.01 |
| 6,061,798 A | 5/2000 | Coley et al. | 713/201 |
| 6,253,337 B1 | 6/2001 | Maloney et al. | 714/38 |
| 6,256,739 B1 * | 7/2001 | Skopp et al. | 726/2 |
| 6,256,773 B1 | 7/2001 | Bowman-Amuah | 717/1 |
| 6,272,129 B1 * | 8/2001 | Dynarski et al. | 370/356 |
| 6,304,262 B1 | 10/2001 | Maloney et al. | 345/418 |
| 6,304,973 B1 | 10/2001 | Williams | 713/201 |
| 6,321,336 B1 | 11/2001 | Applegate et al. | 713/201 |
| 6,370,573 B1 | 4/2002 | Bowman-Amuah | 709/223 |
| 6,381,646 B2 * | 4/2002 | Zhang et al. | 709/227 |
| 6,452,915 B1 | 9/2002 | Jorgensen | 370/338 |
| 6,513,122 B1 * | 1/2003 | Magdych et al. | 726/23 |
| 6,519,703 B1 | 2/2003 | Joyce | 713/201 |

(Continued)

OTHER PUBLICATIONS

Laurent H. Andriantsiferana, et al.; "System and Method for Providing Security in a Network Environment;" U.S. Appl. No. 10/890,450, 31 pages, filed Jul. 12, 2004.

*Primary Examiner* — Catherine Thiaw
(74) *Attorney, Agent, or Firm* — Baker Botts L.L.P.

(57) ABSTRACT

According to one embodiment of the present invention, there is provided a method for providing security in a network environment that includes receiving a flow that propagates through an access gateway. The flow is initiated by an end user associated with the flow and propagates through a network. The method also includes receiving accounting information indicative of the termination of the flow. In response, tearing down of the communication associated with the flow is initiated.

34 Claims, 5 Drawing Sheets

U.S. PATENT DOCUMENTS

| | | | |
|---|---|---|---|
| 6,536,037 B1 | 3/2003 | Guheen et al. | 717/151 |
| 6,549,208 B2 | 4/2003 | Maloney et al. | 345/473 |
| 6,550,012 B1 | 4/2003 | Villa et al. | 713/201 |
| 6,606,744 B1 | 8/2003 | Mikurak | 717/174 |
| 6,615,166 B1 | 9/2003 | Guheen et al. | 703/27 |
| 6,813,638 B1 * | 11/2004 | Sevanto et al. | 709/227 |
| 6,829,238 B2 * | 12/2004 | Tokuyo et al. | 370/392 |
| 6,853,630 B1 * | 2/2005 | Manning | 370/338 |
| 6,876,632 B1 * | 4/2005 | Takeda | 370/259 |
| 6,977,917 B2 * | 12/2005 | Skog et al. | 370/349 |
| 7,054,939 B2 * | 5/2006 | Koch et al. | 709/227 |
| 7,054,949 B2 * | 5/2006 | Jennings | 709/238 |
| 7,212,527 B2 * | 5/2007 | Shah et al | 370/389 |
| 7,228,358 B1 * | 6/2007 | McManus | 709/239 |
| 7,441,269 B2 * | 10/2008 | Jones et al. | 726/14 |
| 7,647,500 B2 * | 1/2010 | Machiraju et al. | 713/169 |
| 7,702,801 B1 * | 4/2010 | Kyle et al. | 709/229 |
| 2004/0015721 A1 * | 1/2004 | Eastlake, III | 713/201 |
| 2004/0030791 A1 * | 2/2004 | Dorenbosch et al. | 709/230 |
| 2004/0107360 A1 * | 6/2004 | Herrmann et al. | 713/201 |
| 2004/0111516 A1 * | 6/2004 | Cain | 709/227 |
| 2004/0221207 A1 * | 11/2004 | Yokota et al. | 714/48 |
| 2005/0198363 A1 * | 9/2005 | Ling et al. | 709/236 |
| 2006/0025181 A1 * | 2/2006 | Kalofonos et al. | 455/574 |
| 2006/0034290 A1 * | 2/2006 | Kalofonos et al. | 370/395.2 |
| 2007/0234416 A1 * | 10/2007 | Matsuoka et al. | 726/12 |

\* cited by examiner

| ATTRIBUTE NUMBER | NAME | EXAMPLE | |
|---|---|---|---|
| ○○○ | ○○○ | ○○○ | |
| 7 | FRAMED PROTOCOL | GPRS | ← 228 |
| 8 | FRAMED IP ADDRESS | IP@10.10.10.10 | ← 230 |
| ○○○ | ○○○ | ○○○ | |
| 40 | ACCOUNT STATUS TYPE | STOP (START) | ← 232 |
| ○○○ | ○○○ | ○○○ | |
| 26/10415 | VENDOR SPECIFIC | STOP INDICATOR | ← 234 |

… # (headers/title shown below)

SYSTEM AND METHOD FOR PROVIDING SECURITY IN A NETWORK ENVIRONMENT USING ACCOUNTING INFORMATION

RELATED APPLICATIONS

This application is a continuation-in-part of U.S. application Ser. No. 10/890,450 entitled System and Method for Providing Security In a Network Environment Using Accounting Information filed Jul. 12, 2004.

TECHNICAL FIELD OF THE INVENTION

This invention relates in general to the field of communications and, more particularly, to a system and method for providing security in a network environment using accounting information.

BACKGROUND OF THE INVENTION

Networking architectures have grown increasingly complex in communications environments. In addition, the augmentation of clients or end users wishing to communicate in a network environment has caused many networking configurations and systems to respond by adding elements to accommodate the increase in networking traffic. Communication tunnels or links may be used in order to establish or to gain access to a network, whereby an end user or an object may initiate a tunneling protocol by invoking a selected location or a network node. The network node or selected location may then provide a platform that the end user may use to conduct a communication session.

As a packet traverses the network through a given communication tunnel, certain network elements track or monitor its behavior (e.g. start and stop times), path (e.g. destination and source), and any other relevant parameters. However, not every network element follows each packet's actions this closely. Thus, some network elements are not aware that certain actions are occurring. At any given point in time during normal network communications, an internet protocol (IP) address of an end user may be left unassigned (e.g. after the end user has been disconnected from the network) or reassigned to a next end user seeking to initiate a new communication session. This lapse allows a given IP address to be left unattended for a brief time period, whereby certain network elements are unaware of this issue. This may create a security concern or an integrity issue because malicious traffic may be propagating in the network. For example, the integrity of network accounting and billing may be affected where a user is billed for the call of another user.

SUMMARY OF THE INVENTION

According to one embodiment of the present invention, there is provided a method for providing security in a network environment that includes receiving a flow that propagates through an access gateway. The flow is initiated by an end user associated with the flow and propagates through a network. The method also includes receiving accounting information indicative of the termination of the flow. In response, tearing down of the connection associated with the flow is initiated.

Certain embodiments of the present invention may provide a number of technical advantages. For example, according to one embodiment of the present invention a communications approach is provided that allows for enhanced network security. The proffered architecture enables complete synchronization of an access gateway and a network element (e.g. a firewall), allowing enhanced security for an Internet protocol (IP) address propagating in the network. The configuration addresses imperfect information in network security by allowing a network element to obtain additional information not normally provided once an end user is disconnected from the given network. Such a security issue is even more important in a wireless environment where multiple end users are constantly being rotated on and off the network. The provided architecture may capitalize on the knowledge of access gateways, which can keep track of any events involving an end user. The events, as they occur, may be communicated to a network element such that an internal table can be updated. This avoids a situation where the network element maintains outdated information that is stored about the implicated IP address, sessions, or flows.

Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS OF THE INVENTION

Figure 1A:
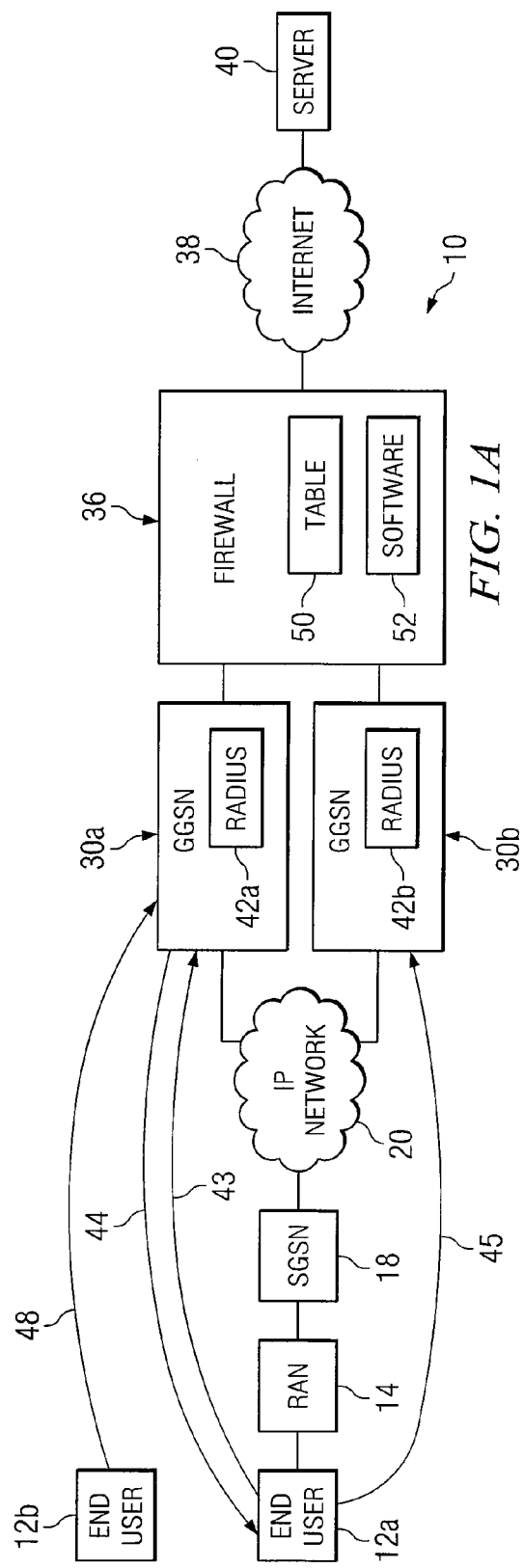
FIG. 1A is a simplified block diagram of a communication system for providing security in a network environment in accordance with one embodiment of the present invention.

FIG. 1A is a simplified block diagram of a communication system 10 for communicating data in a network environment. Communication system 10 may include an end user 12, a radio access network (RAN) 14, a serving general packet radio service (GPRS) support node (SGSN) 18, and an internet protocol (IP) network 20. Additionally, communication system 10 may include a firewall 36 (that may include a table 50 and a software program 52) and multiple gateway GPRS support nodes (GGSNs) 30a-b. Communication system 10 may also include an Internet 38 and a server 40.

FIG. 1A may be generally configured or arranged to represent a 3G communication architecture applicable to a Global System for Mobile (GSM) environment in accordance with a particular embodiment of the present invention. However, the 3G architecture is offered for purposes of example only and may alternatively be substituted with any suitable networking protocol or arrangement that provides a communicative platform for communication system 10. For example, communication system 10 may cooperate with any version of a GPRS tunneling protocol (GTP). This may be inclusive of first generation, 2G, and 2.5G architectures that provide features for workload distribution.

In order to understand the extent of the teachings of communication system 10, it is useful to offer some overview as to the way in which user connections are generally managed. This description is offered for purposes of example only and should not be construed in any way to limit the principles, characteristics, and features of the present invention. The following explanation is provided in the context of a firewall, but such an example is equally applicable to any other network element that poses the described security concern.

Firewalls generally operate independently, whereby they learn the connections and learn about the flows that are propagating through them. Because of such operations, firewalls generally maintain certain flows during periods of inactivity. But there is an inherent limitation in such a model. In some instances, information important to the network is not seen by all parties of the network. Thus, some operations may be performed based on incorrect information.

In an example architecture, consider a GPRS/universal mobile telecommunication system (UMTS) data network where mobile users frequently connect and disconnect to the GPRS/UMTS service. Due to this frequent connection/disconnection, different users may be allocated the same IP address. Hence, the same IP address can be used by user X, and in a very short period, the same IP address may be used by user Y. In particular, the corresponding firewall for this system may attempt to keep track of user sessions dynamically, whereby a period of inactivity on a certain session will eventually clear the dynamically created entries on a firewall.

In a particular example, end user 12 may initiate communication with a server 40 by, for example, sending a "PDPCtxReq" message, as indicated by reference numeral 43 to set up a tunnel to server 40. In response, GGSN 30a may return a "PDPAcc (IP@10.10.10.10)" message, for example, as indicated by reference numeral 44, to create a connection to server 40. Thus, end user 12 is provided in this example an IP address of "IP@10.10.10.10" for use in the subsequent call flow. Once the connection is established, IP traffic may occur between end user 12 and server 40, as indicated by reference numeral 45. When end user 12 terminates the call, SGSN 18 instructs the GGSN 30a to delete the connection, by for example, a "DeletePDPCtxReq." However, although GGSN sees this delete message, because of its placement, firewall 36 does not. Thus, firewall 36 does not tear down the associated connection with server 40.

When another end user 12b attempts to communicate with server 40, as indicated by reference numeral 48, it may receive a response from GGSN 30 that includes the IP address previously used with end user 12a ("IP@10.10.10.10"), because the GGSN 30a sees this as an available address. However, because the communication flow with server 40 associated with this address has not been torn down (because firewall 36 does not have information suggesting it should be torn down), server 40 believes the calls from users 12a and 12b to be one continuous call, and user 12a is charged for both.

Communication system 10 addresses this issue by capitalizing on other information within network 10 that is indicative of whether a connection should be terminated. In particular, in one embodiment, GGSN 30 is configured to utilize RADIUS accounting software, indicated by reference numeral 42, for accounting purposes. As described in greater detail below, this RADIUS software 42 issues STOP commands upon receipt of the delete connection request from user 12a, such as request 45. The RADIUS command is provided to firewall 36, which in response, initiates tearing down the connection associated with the end user 12a who initiated the disconnect request.

Because the assigned GGSN is the component that is aware of user sessions and their associated IP address, and a firewall is the device providing security to the network, it is generally unaware of user sessions and cannot correlate a user to an IP address. Thus, the firewall would normally build state information based on connection requests and responses.

As described above, firewall 36 of communication system 10 may behave in a different manner than conventional firewalls. The assigned GGSN, through accounting software 42, may indicate to firewall 36 the start and stop events of user sessions, as well as the corresponding IP address. For example, an accounting STOP indicator allows firewall 36 to clear any sessions with the associated IP address. An accounting START indicator communicated to firewall 36 can be used to setup certain additional policies associated with a user, as well as clearing any prior state information. This allows firewall 36 to protect the network dynamically and to avoid un-solicited packets being received. Communication system 10 may use a protocol between the GGSN and firewall 36, allowing a standard GGSN to synchronize with firewall 36. Note that such a protocol is 'protocol independent' and provides dynamic security without any user-initiated packets to be sent. In addition, such a configuration can be extended to cover any access gateways and network elements, as explained more fully below with reference to FIG. 1B.

End user 12 is a client or a customer wishing to initiate a communication in communication system 10 via IP network 20. End user 12 may be inclusive of devices used to initiate a communication, such as a computer, a personal digital assistant (PDA), a laptop or an electronic notebook, a telephone, a mobile station, or any other device, component, element, or object capable of initiating voice or data exchanges within communication system 10. End user 12 may also be inclusive of a suitable interface to the human user, such as a microphone, a display, a keyboard, or other terminal equipment (such as for example an interface to a personal computer or to a facsimile machine in cases where end user 12 is used as a modem). End user 12 may also be any device that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

RAN 14 is a communications interface between end user 12 and SGSN 18. RAN 14 may comprise a base transceiver station and a base station controller. The communications interface provided by RAN 14 offers connectivity and allows data to be exchanged between end user 12 and any number of selected elements within communication system 10. RAN 14 facilitates the delivery of a request packet generated by end user 12 and the reception of information sought by end user 12. RAN 14 is only one example of a communications interface between end user 12 and SGSN 18. Other types of communications interfaces may be used for a desired network design based on particular needs.

IP network 20 represents a series of points or nodes of interconnected communication paths for receiving and transmitting packets of information that propagate through communication system 10. IP network 20 offers a communicative interface between end user 12 and selected GGSNs 30a-b and may be any local area network (LAN), wireless local area network (WLAN), metropolitan area network (MAN), wide area network (WAN), virtual private network (VPN), or any other appropriate architecture or system that facilitates communications in a network environment. IP network 20 implements a user datagram protocol (UDP)/internet protocol (UDP/IP) communication language protocol in a particular embodiment of the present invention. However, IP network 20 may alternatively implement any other suitable communication protocol for transmitting and receiving data or information within communication system 10.

SGSN 18 and GGSNs 30a-b are network elements that cooperate in order to facilitate a communication session involving end user 12. GGSNs 30a-b are network nodes that may be working in conjunction with multiple SGSNs 18 to provide a communications medium in a GPRS service network environment in communicating data exchanges within communication system 10. GPRS represents a packet-based data bearer service for communication services that may be delivered as a network overlay for any type of suitable network configuration or platform. GPRS generally applies packet-radio and packet switching principles to transfer data packets in an efficient way between GSM elements or units and external packet data networks. GPRS may support multiple internet communication protocols and may enable existing IP, X.25, or any other suitable applications or platforms to operate over GSM connections. It is imperative to note that GGSNs 30a and 30b and SGSN 18 may be easily replaced with any components that offer a communicative interface to end user 12. Any generic access gateway may readily adopt the teachings of the present invention. Moreover, any network devices that provide some form of connectivity to end user 12 may be used in conjunction with firewall 36.

Firewall 36 is a piece of network equipment that is capable of evaluating or inspecting a packet (or an entire communication flow) in order to determine if the information is valid, the information is in its proper format, and/or the information is being rerouted to an appropriate next destination. Firewall 36 may be coupled to GGSNs 30a and 30b and may operate to discard, delete, or otherwise avoid damaging data segments sought to be communicated to any element or device within communication system 10. Firewall 36 is a system architecture that enforces an access control policy between two nodes, such as a virtual private network (VPN) and a public node, such as Internet 38.

Firewall 36 may include table 50 as well as accounting information software 52 that allows it to listen to (or glean information from) a given set of flows in accordance with the teachings of the present invention. Note that as used herein in this document, the term 'glean' (in the context of information associated with end user 12) includes, but is not limited to, learning, identifying, recognizing, listening to, watching, or otherwise monitoring. Alternatively, this gleaning capability may be provided in any suitable hardware, random access memory (RAM), application specific integrated circuit (ASIC), algorithm, read-only memory (ROM), erasable programmable ROM (EPROM), electronically EPROM (EEPROM), or in any appropriate combination thereof or in any other suitable component, device, element or object operable to provide such gleaning capabilities and functions. Additional details related to table 50 are provided below in conjunction with FIG. 1C.

In operation of an example embodiment, communication system 10 may simply leverage RADIUS (or any other existing protocol) in updating the internal information of firewall 36. Firewall 36 generally includes table 50 that includes information associated with flows. In this example, firewall 36 can listen to or otherwise monitor events (via a corresponding GGSN) such that it can identify the corresponding IP address and then clear or remove all internal flows that it has built for that IP address (e.g. in the context of an accounting STOP indicator). Similarly, firewall 36 can identify an accounting START event and clean up any outdated flows (if any exist) in table 50. In one embodiment, this functionality is provided by software 52. However, in other embodiments, firewall 36 may perform these functions without software 52 through, for example, hardware, firmware, or other approaches.

Internet 38 represents a public internet that offers a communicative interface for GGSNs 30a and 30b to direct information to mobile terminals 12a and 12b and may be any LAN, WLAN, MAN, WAN, VPN, Intranet or any other appropriate architecture or system that facilitates communications in a network environment. Internet 38 implements a UDP/IP communication language protocol in a particular embodiment of the present invention. However, Internet 38 may alternatively implement any other suitable communication protocol for transmitting and receiving data or information within communication system 10. Additionally, Internet 38 may interface with any additional element or object in order to facilitate proper data management where appropriate and based on particular needs.

Server 40 is any network component, such as a computer, to which end user may communicate through or with.

Figure 1B:
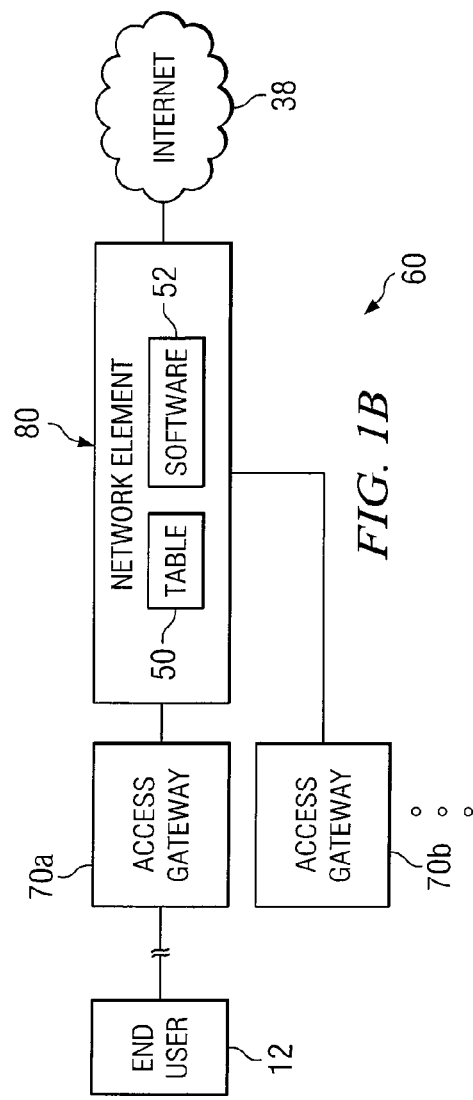
FIG. 1B is a simplified block diagram of an alternative embodiment of the communication system.

FIG. 1B is a simplified block diagram of an alternative embodiment of the present invention. FIG. 1B illustrates a generic system 60 that operates in a similar manner as that of communication system 10. FIG. 1B includes a set of generic access gateways 70a and 70b and a network element 80, which includes table 50. Because communication system 10 may be extended to any scenario in which end user 12 is provided with connectivity (in the context of a wired or a wireless connection or coupling), end user 12 may use any type of generic access gateway (e.g. access gateways 70a or 70b). For example, access gateways 70a and 70b may be a network access server (NAS), foreign agents, or any other suitable interface that offers some connectivity to end user 12. End user 12 may use a dedicated connection of some form or use forms of multiple access protocols where appropriate. Access may be associated with, for example, point-to-point protocol (PPP) or alternatively with layer three protocols over an L2 layer in accordance with particular needs. Such an embodiment may include any suitable tunnel terminators and/or tunnel initiators that may be operable to communicate with firewall 36. Other protocols may also be readily accommodated.

Generic system 60 is broad and expansive and, therefore, could readily accommodate any number of access gateways, whereby the access gateways can assign IP addresses and provide general subscriber management functions. Accordingly, generic system 60 may be applicable to any wireless technology, broadband architecture, or any other configuration where security presents an issue.

Network element 80 is considerably flexible in that any suitable network device may be positioned in its place in order to achieve the teachings of the present invention. For example, network element 80 may be a firewall (as illustrated in FIG. 1A), a router, a switch, a loadbalancer, a processor, a bridge, a gateway, or any other suitable element operable to perform some processing or routing operation for an incoming packet. The use of a firewall in FIG. 1A has been offered for purposes of example only in the context of one application that involves security measures. Other applications may readily include instances where some other device is used.

In operation of an example embodiment of generic system 60, access gateway 70a may provide connectivity to Internet 38 for end user 12. Between these two elements is network element 80, which operates to protect end user 12 from malicious traffic, breaches in security, false denial of service messages, etc. However, because of the small gap in time that is normally present in such a network configuration as identified above, the gap offers a loophole for hacker 40 (or any other entity) to wreak havoc on the system. Thus, network element 80 is configured much like firewall 36 to be able to synchronize with a corresponding access gateway 70a or 70b. This may be achieved by network element 80 gleaning information associated with events that involve end user 12 and then updating its table 50.

Figures 1C, 2A:
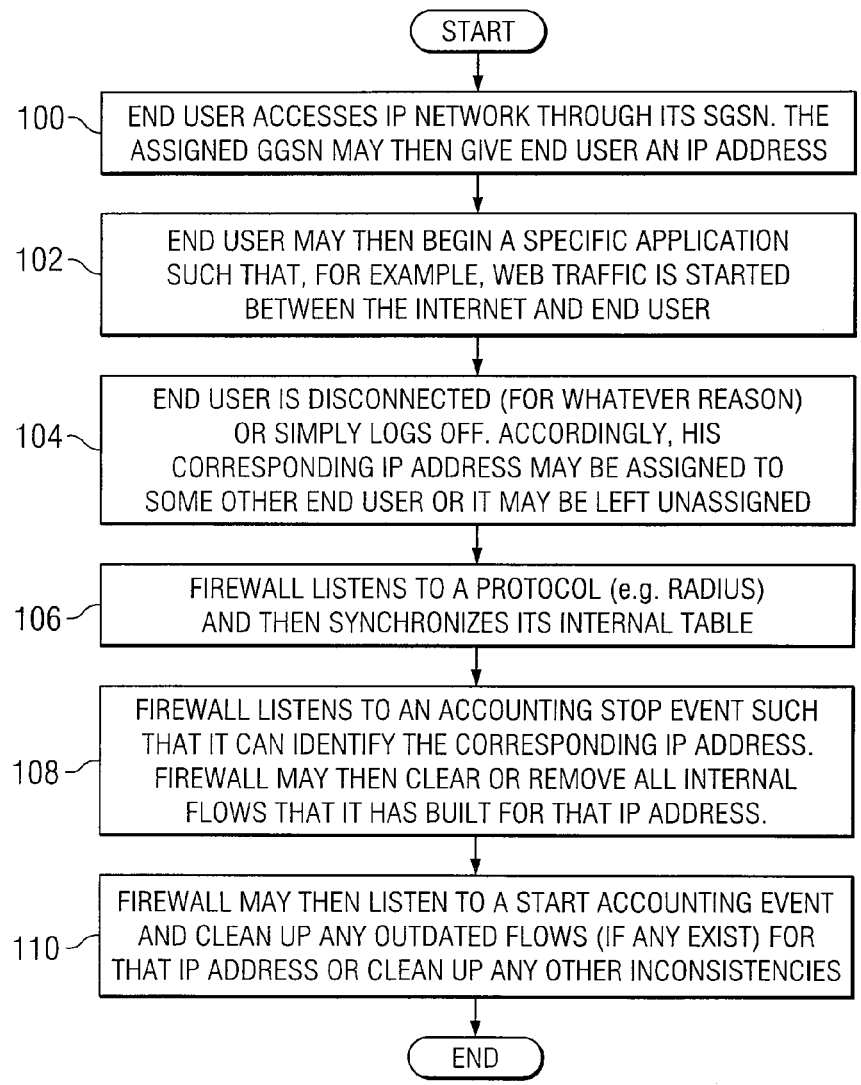
FIG. 1C is a simplified block diagram of a table that may be included within a network element that is provided in the communication system.
FIG. 2A is a flowchart illustrating a process for terminating a connection according to the teachings of the invention.

FIG. 1C is a simplified block diagram illustrating table 50 in an example implementation of either communication system 10 or generic system 60. Table 50 may be stored within, or provided external to, firewall 36 and/or network element 80. Table 50 may include any suitable software, hardware, RAM, ASIC, algorithm, ROM, EPROM, EEPROM, or in any other suitable component, device, element or object where appropriate and based on particular needs. Table 50 may be readily replaced with a database or any other suitable memory element operable to store end user information (e.g. relating to sessions, flows, connections, etc.).

As illustrated in FIG. 1C, table 50 may include any number of data segments associated with session objects, end users, or flows. In one example implementation, table 50 includes an end user column, an IP address column (for the corresponding end users), a quality of service (QoS) type column, a date/time column, and a miscellaneous column. Such categories of information are not exhaustive and may certainly be added to, deleted, or restricted and/or changed significantly. The categories of information have been provided for purposes of example only and should be construed as such.

Table 50 may alternatively include (and be indexed by) any other suitable information pertinent to communication sessions or flows propagating in communication system 10. For example, table 50 may include policy/profile/subscription information, destination IP address, protocol, source and destination ports, or capability characteristics of devices being employed by end user 12. Table 50 may be suitably updated by firewall 36 and/or network element 80 with information that is provided by RADIUS flows such that it is synchronized with its corresponding access gateway.

FIG. 2A is a simplified flowchart illustrating a series of example steps associated with a method for providing security in a network environment. The method may begin at step 100 where end user 12 accesses IP network 20 through its SGSN 18. Subsequently, GGSN 30a (its assigned GGSN) may then give end user 12 an IP address. In this example configuration, end user 12 has been assigned an IP address of 'A' with a corresponding port 'B.' End user 12 may then begin a specific application such that, for example, web traffic is started between Internet 38 and end user 12 at step 102. Thus, a certain flow has been started that propagates through firewall 36.

At step 104, end user 12 is disconnected from (for whatever reason) or simply logs off the network. Accordingly, his corresponding IP address 'A' may be assigned to some other end user or it may be left unassigned. Note that this is the vulnerable point in a given system where that same IP address may be inadvertently assigned to another end user right after it has been released. This could be frustrating for a service provider who is attempting to bill for data that (ostensibly) is being provided to end user 12. End user 12 is also frustrated because he is being charged for data that he neither received nor authorized. This inconsistency in billing further creates additional overhead for a service provider in attempting to figure out what went wrong in the network.

Firewall 36 avoids this problem by gleaning information from a protocol (e.g. RADIUS) such that events from the access gateway (e.g. GGSN 30a or 30b) are updated, in this example in internal table 50. This is illustrated in step 106. In this example scenario, firewall 36 listens to an accounting STOP event issued by the accounting software such that it can identify the corresponding IP address. Firewall 36 may then clear or remove all internal flows that it has built for that IP address at step 108. In addition, firewall 36 may then listen to (or otherwise identify) a START accounting event and clean up any outdated flows (if any exist) for that IP address (or clean up any other consistencies) at step 110 by comparing any stored attribute values for the previous user with that of the new user. This process may continue such that firewall 36 has a current table 50 and, further, that the above-identified security gap is closed.

Some of the steps illustrated in FIG. 2A may be changed or deleted where appropriate and additional steps may also be added to the flowchart. These changes may be based on specific communication architectures or particular interfacing arrangements and configurations of associated elements and do not depart from the scope or the teachings of the present invention.

Figure 2B:
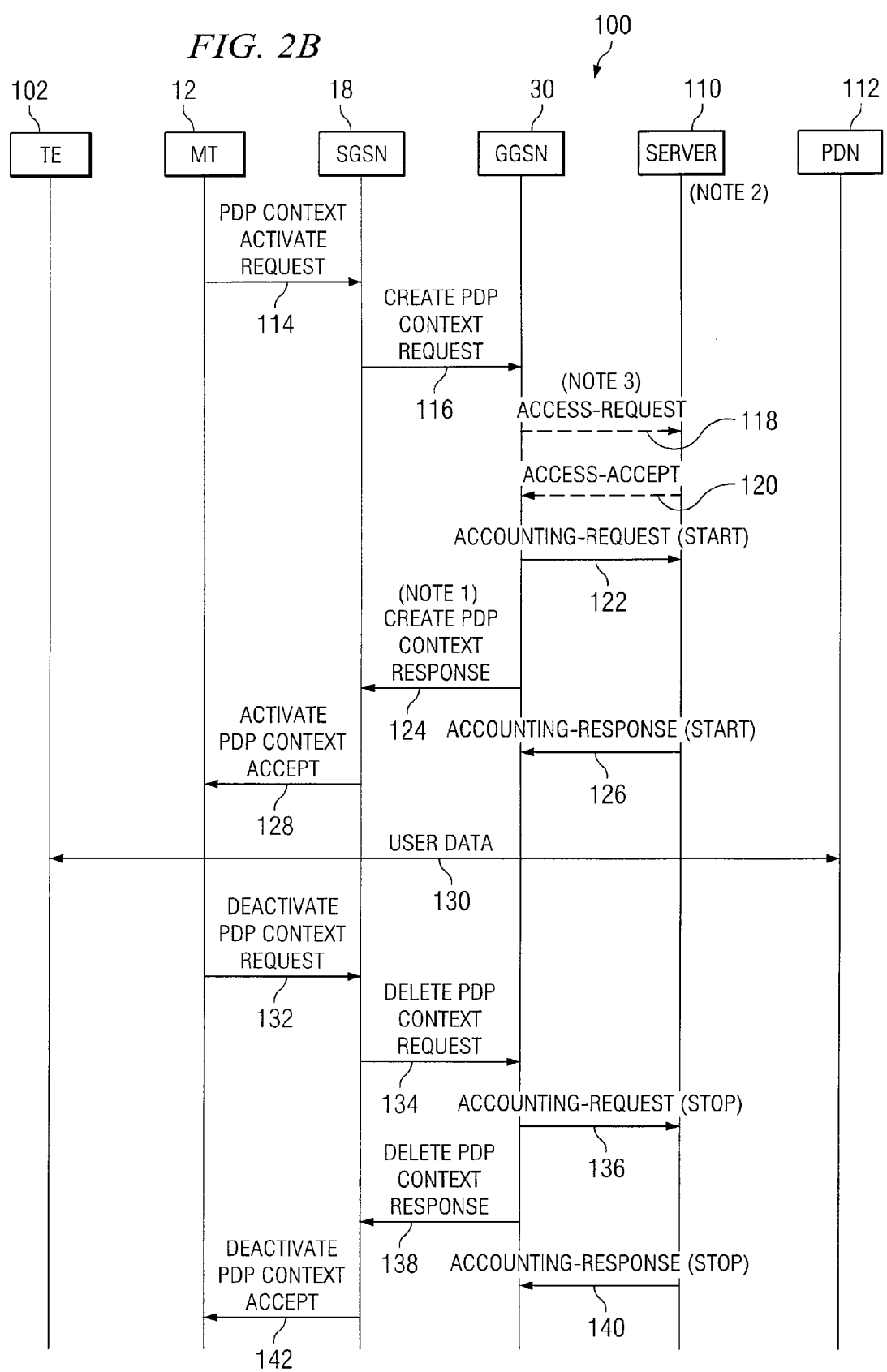
FIG. 2B is a call flow diagram illustrating portions of a call flow according to the teachings of the invention.

FIG. 2B is a call flow diagram illustrating an example call flow according to the teachings of the invention, showing additional details of one embodiment of the above-described method. Illustrated in FIG. 2B are a plurality of entities between which communication takes place. These include a TE 102, a mobile terminal (or end user) 12, SGSN 18, GGSN 30, accounting server 110, and PDN 112. End user 12, SGSN 18, GGSN 30, and server 40 are described above. TE 102 stands for terminal equipment. Accounting server 110 stands for a server that maintains accounting software, such as RADIUS. Alternatively, such accounting software could be maintained on another element in the network, such as GGSN 30. PDN 112 stands for packet data network.

At step 114 a PDP context activate request message is sent from end user 12 to SGSN 18, corresponding to reference numeral 42 of FIG. 1A. At step 116 a create PDP context request message 116 is sent by SGSN 18 to GGSN 30. GGSN 30 then sends an access request message 118 to server 14, indicated by reference numeral 118. Server 40 responds to GGSN 30 with an access accept message 130. This access accept message 130 provides an IP address that will be assigned to end user 12 for this communication.

At this point, GGSN 30 provides an accounting request START message 122 to server 110, which starts an accounting of the usage by end user 12 associated with this call flow. It should be noted that GGSN 30 (or other device hosting the accounting software) may need to be configured to transmit such accounting messages to firewall 36 or other network element 80. This may also involve configuring a listing port on firewall 36 or other network element 80 with the IP address of the accounting server and/or GGSNs. A create PDP context response message is provided by GGSN 30 to SGSN 18 at step 124. At step 126 server 110 responds to the accounting request (START) message 122 with an accounting response (START) message 126 provided to GGSN 30.

According to the teachings of the invention, firewall 36 or network element 80 may take certain actions in response to receiving an accounting request START 122 that facilitates tearing down of a communication flow that may otherwise remain inadvertently open, as described in greater detail below in conjunction with FIG. 4A.

At step 128 an activate PDP context accept message is sent to end user 12. At step 130 communication may take place between TE 102 and PDN 112 based upon the connection established by the previous steps.

At some point, the call will terminate. This may occur due to a disconnection or because end user 12 terminates the call. Then end user 12 sends a deactivate PDP context request message 132 to SGSN 18, which sends a delete PDP context request message 134 to GGSN 30. This results in GGSN 30 sending an accounting request (STOP) message 136 to server 110. According to the teachings of the invention, this account request (STOP) message results in firewall 36 (or network element 80) performing particular activities described below that results in the tearing down of the communication flow associated with an IP address assigned to end user 12 for the previous communication. A delete PDP context response message 138 is then sent from GGSN 30 to SGSN 18. At step 140 accounting response stop is sent from server 40 to GGSN 30. Finally, a deactivate PDP context accept message 142 is sent from SGSN 18 end user 12.

As can be seen, absent processing by server 110 in response to an accounting request STOP message 136, it may be possible for the connection set up by end user 12 to remain open because only the GGSN 30 receives the delete PDP context request, but the firewall 36 does not. However, because according to this embodiment the accounting request (STOP) message 136 is sent to server 110 (and thus firewall 36), firewall 36 (or network element 80) can determine that the connection should be torn down. Example details with one embodiment of tearing down the connection associated with end user 12 in response to receiving the accounting request STOP message 136 are described in greater detail in conjunction with FIGS. 3A through 4B.

Figures 3A, 3B:
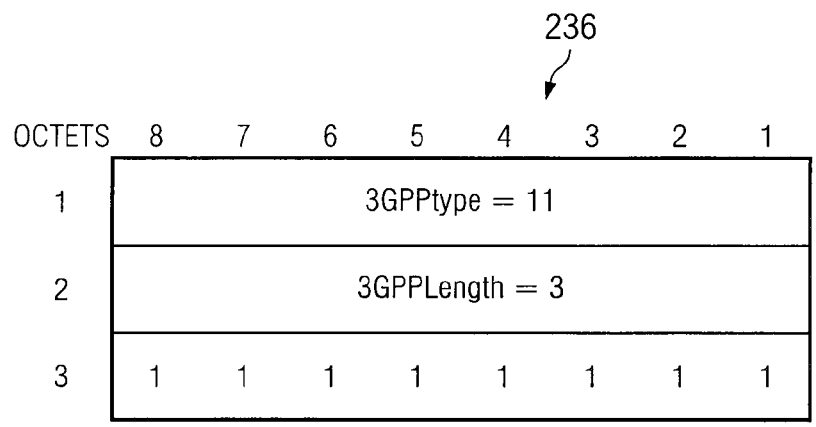
FIG. 3A is a block diagram illustrating an example accounting request that may be used according to the teachings of the invention.
FIG. 3B is a block diagram illustrating an example STOP indicator that may be used with the teachings of the invention.

FIG. 3A is a block diagram illustrating portions of an example accounting request 220 according to one specific example implementation of the present invention. In this example, the well-known RADIUS accounting package is utilized, and thus the example accounting request 220 conforms to RADIUS protocols. However, other types of accounting packages and associated accounting requests may be utilized without departing from the teachings of the invention.

Shown in FIG. 3A are three columns associated with accounting request 220; however, other columns may be utilized. Column 222 represents an attribute number associated with a particular attribute in the accounting request 220. Column 224 represents a name provided for the particular attribute, and column 226 provides an example of the particular attribute. As indicated, only specific attributes are specifically described with respect to accounting request 220. These particular attributes are particularly relevant to the use of the accounting request 220 to initiate tearing down of a connection to avoid overbilling.

At row 228 attribute number "7" has a name of "framed protocol", which indicates the protocol specified by the user, such as end user 12 for communication. In this example, the protocol is "GPRS"; however, any suitable protocol may be used. Row number 230 corresponds to attribute number "8" which has a name of "Framed IP address," which indicates the IP address associated with the end user 12 (which may have been provided by server 40, as described above). In this example, the IP address is IP@10.10.10.10. Row number 232 corresponds to attribute number "40," which has a name of "account status type," which indicates the type of account status associated with the accounting request 220. Two examples of account status type are STOP and START. At row 234 attribute number "26/10415" has a name of "vendor specific." This attribute is specifically used in conjunction with the teachings of the invention for providing an indication that a connection should be torn down. The example value for this attribute is a stop indicator 236. Stop indicator 236 is described in greater detail below in conjunction with FIG. 3B.

FIG. 3B is a block diagram illustrating example details of one example embodiment of a stop indicator for use as part of accounting request 220. According to this example, stop indicator 236 may include rows specifying the 3GPP type and length, with the last row having a value specifying that a connection should be torn down. In this example, providing a value of all ones indicates that a communication flow associated with the framed IP address (attribute number 8) should be torn down.

Figure 4A:
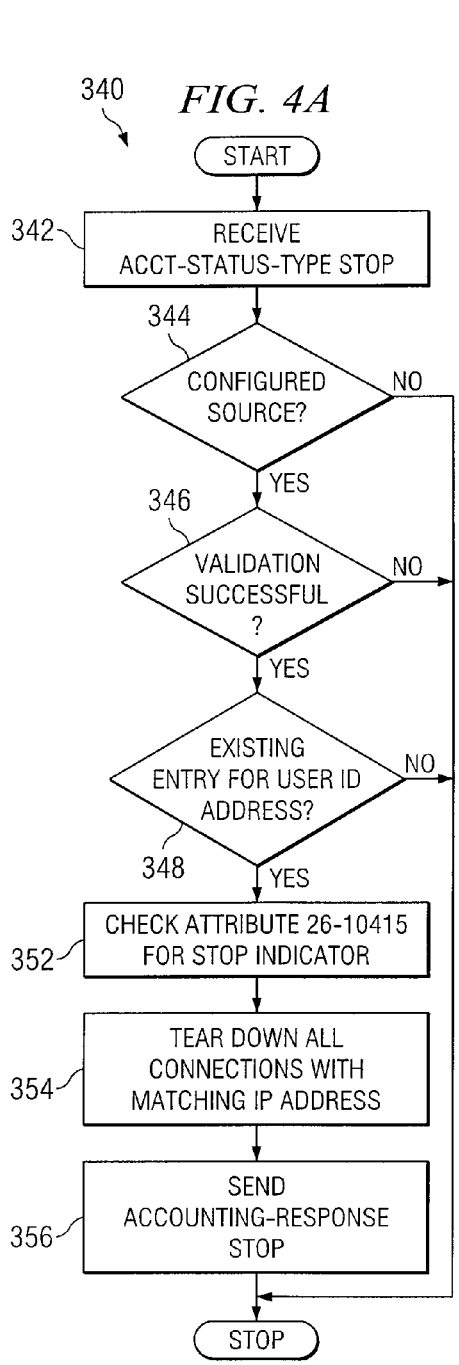
FIG. 4A is a flowchart illustrating example steps associated with tearing down an open connection in response to receiving an accounting STOP request according to the teachings of the invention.
Figure 4B:
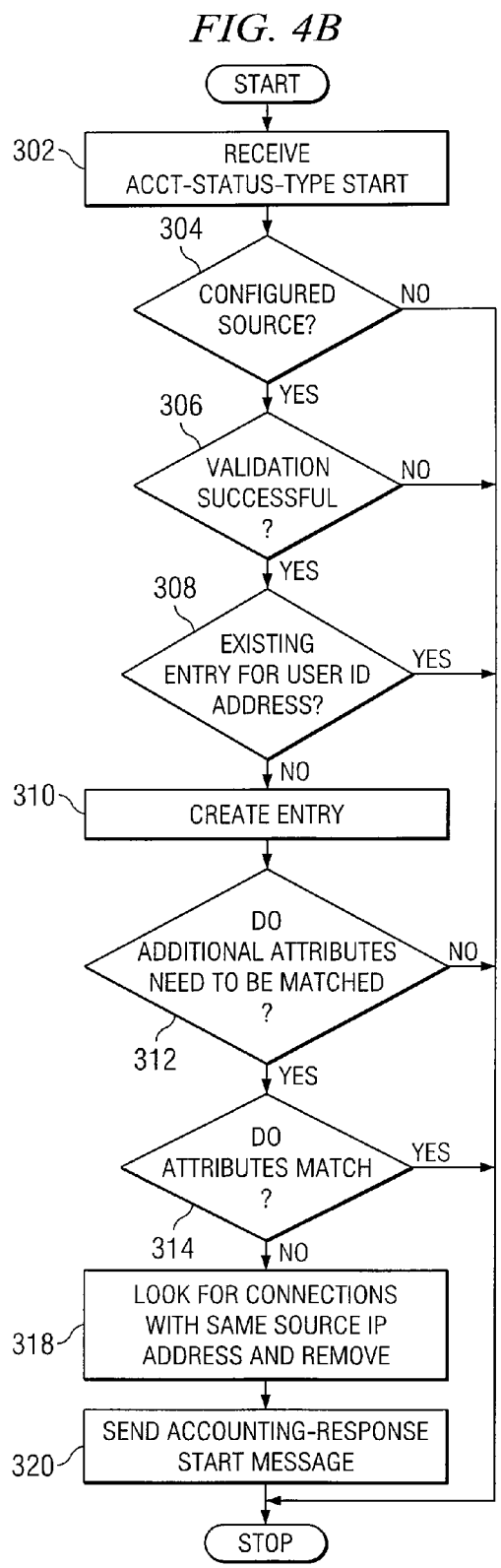
FIG. 4B is a flowchart illustrating example steps associated with a process for receiving and processing an accounting START request according to the teachings of the invention.

The attributes described in FIGS. 3A and 3B may be used to facilitate tearing down of old connections, as described in greater detail in conjunction with FIGS. 4A and 4B.

FIG. 4A is a flowchart illustrating a method 340 for tearing down a communication flow that has remained inadvertently open according to the teachings of the invention. The following steps may be performed by firewall 36 or other suitable network element, such as network element 80. In general, a search of all open connections matching the IP address associated with the STOP message (in the Framed IP address attribute at row 230 of FIG. 3A). At step 342, it is determined that the received accounting message has a type of "STOP" (from row 232). At 344 a check is made to determine if the message came from a configured source, in a similar manner to step 304 of FIG. 4B, described below. If a message did not come from a configured source then it is dropped and processing halts. At step 346 the message is validated. As describe below in conjunction with FIG. 4B, validation refers to additional protection that allows secure identification of a call from an end user 12. In one embodiment, a "shared secret" is utilized. The shared secret may be entered from the user of the host sending the accounting message to the firewall to validate the message to avoid reacting to "spoofed" messages. In one embodiment, this "shared secret" may be used to validate an "Authenticator" field in the accounting messages, and the Authenticator field is derived by an MD5 hash which includes the shared secret. If validation fails, processing halts.

At step 348 a check is made to determine if there is an existing entry in table 50 for the IP address associated with end user 12. Then, if the protocol type provided by the user is GPRS (row 128 of FIG. 3A), then a check for attribute 26-10415 is made. This check is made to determine if a session STOP indicator is provided (row 234 of FIG. 3A). In the above described embodiment, providing this STOP indicator with all ones indicates that the connection with the user IP address should be torn down. In addition, any associated entry in table 50 is removed. At step 354 all connections are torn down that have a source IP matching the user IP address on the configured interface. The user entry in table 50 is removed, if it exists. At step 356 an accounting response STOP message is sent (if configured to do so by a user), such as message 140 of FIG. 2B.

FIG. 4B illustrates a method 300 associated with responding to an accounting START request. These steps may be performed by firewall 36 or other network element, such as network element 80. Additional advantages may be realized by firewall 36 (or other network element) receiving, and acting upon, an accounting START request; however, it should be understood that such a network element may tear connections down in response to an accounting STOP message without the following process.

At step 302 an accounting request is received and its type is checked. If the type is START the remaining steps are performed. At step 304 it is determined whether the message came from a configured source. In particular, it is determined whether the message came from a GGSN (or other suitable device) that has been configured to provide accounting requests that may include information associated with indicating that a particular connection should be closed. If the message is not from a configured source it is dropped and the process concludes. If the message is from a configured source then it is validated at step 306. In one embodiment, end user 12 may be presented the option to provide a shared secret such that future communications can be validated. If validation fails processing stops and the message is dropped. One example of such a shared secret is described above in conjunction with FIG. 4A.

If validation is successful then it is determined at step 308 whether an existing entry in an associated table, such as table 50, corresponds to the user IP address received with the accounting START message. If an entry does not exist, then an entry is created at step 310 based on the user IP address, and associated attributes are stored and their values are configured. At step 312 a determination is made of whether any additional attributes need to be matched. In one embodiment, an end user 12 may specify additional attributes that may be used to confirm the identity of the user. If no additional attributes need to be matched the process concludes. However, if additional attributes need to be matched, then at step 314 a check is made of whether the attributes stored in the entry match the ones in the message. The process concludes if the attributes match.

However, if the attributes do not match, this indicates that the accounting for the user IP address has changed. In other words, the IP address has been reassigned to another user and a new accounting needs to be started for this user. In such a case, at step 318 all connections with the source IP address on the same interface as the configured host matching the user IP address are examined and removed. Additionally, the attribute values in the entry are set to the ones in the message. At step 320 an accounting start response message is sent, such as message at 126 in FIG. 2B, if configured to do so by the user.

Thus, if it is determined that a currently used IP address is associated with a different end user 12 than the current end user 12, then remedial action is taken to correct the accounting for that particular call. However, according to the teachings of the invention such misuse of an improper IP address may be substantially avoided by the method of FIG. 4A.

Although the present invention has been described in detail with reference to IP communications, communication system 10 may be used for any tunneling protocol involving user requests in an environment where security is an issue. Any suitable communications that involve a network node or an access gateway that facilitates end user communications may benefit from the teachings of the present invention. The use of end user 12 and IP communications have only been offered for purposes of teaching and should not be construed to limit the scope of the present invention in any way.

Moreover, although communication system 10 has been illustrated with reference to particular protocols facilitating the proposed process, these elements may be replaced by any suitable architecture or configuration that achieves the intended functionality of communication system 10 or generic system 60. For example, any suitable communicative platforms may be used to effectuate the operations that provide information to firewall 36 or network element 80. Firewall 36 and/or network element 80 may utilize information via any suitable backend control protocol (e.g. GTP', RADIUS, DIAMETER, terminal access controller access system (TACACS), etc.). Such alternatives are clearly within the broad scope of communication system 10.

Numerous other changes, substitutions, variations, alterations, and modifications may be ascertained to one skilled in the art and it is intended that the present invention encompass all such changes, substitutions, variations, alterations, and modifications as falling within the spirit and scope of the appended claims.

What is claimed is:

1. An apparatus for providing security in a network environment, comprising:
a network element providing security for a network, the network element inspecting incoming communications that are entering the network to determine validity prior to forwarding the incoming communications to the network, wherein the validity of the incoming communications is determined based on a shared secret received from an end user associated with the incoming communications, the network element further operable to:
receive a communication flow that propagates through an access gateway, the communication flow being initiated by the end user associated with the communication flow and propagating through the network;
receive from the access gateway accounting information, the accounting information generated by accounting software, the accounting information indicating the communication flow associated with the end user has terminated, the accounting information further indicating an IP address assigned to the end user prior to disconnecting from or logging off the network;
determine from the accounting information the IP address assigned to the end user prior to disconnecting from or logging off the network;
determine that an entry associated with the determined IP address of the end user prior to disconnecting from or logging off the network exists in a database;
in response, removing the entry associated with the determined IP address of the end user from the database; and
wherein the network element is operable to determine from the accounting information that the communication flow associated with the end user has terminated even though the network element does not maintain a direct connection with the end user.

2. The apparatus of claim 1, wherein the network element that does not maintain the direct connection with the end user and through which the communications flow is propagated includes a table operable to store the IP address.

3. The apparatus of claim 1, wherein the accounting information comprises a RADIUS STOP indicator.

4. The apparatus of claim 1, wherein the accounting information comprises a RADIUS START message.

5. The apparatus of claim 1, wherein the network element is a selected one of a group of network elements, the group consisting of:
a) a firewall;
b) a switch;

c) a loadbalancer;
d) a gateway;
e) a bridge;
f) a router; and
g) a processor.

6. The apparatus of claim 1, wherein the network element is operable to use a selected protocol to glean the IP information, the selected protocol being included in a group of protocols consisting of:
a) RADIUS;
b) TACACS; and
c) DIAMETER.

7. The apparatus of claim 1, wherein the access gateway is a general packet radio gateway service (GPRS) support node (GGSN).

8. The method of claim 1, the network element further operable to:
determine that the access gateway has not been configured to provide accounting information indicating the communication flow associated with the end user has terminated; and
drop the received accounting information in response to the determination that the access gateway has not been configured to provide accounting information indicating the communication flow associated with the end user has terminated.

9. The apparatus of claim 1, the network element further operable to:
in response to receiving the accounting information indicating that the communication flow associated with the end user has terminated, tear down a connection between the network element and a network server, the connection assigned to the communication flow associated with the end user, the connection used for propagating the communication flow through the network element to the network server.

10. The method of claim 1, further comprising:
detecting, by the network element, an event occurring at the access gateway; and
synchronizing the accounting information when the event is detected.

11. The method of claim 1, further comprising:
using the network element to monitor communications between the access gateway and a radius server;
determining from the communications between the access gateway and the radius server that a stop accounting event has occurred; and
synchronizing the accounting information maintained at the network element to reflect the stop accounting event.

12. A method for providing security in a network environment, comprising:
using a network element to provide security for a network, the network element inspecting incoming communications that are entering the network to determine validity prior to forwarding the incoming communications to the network, wherein the validity of the incoming communications is determined based on a shared secret received from an end user associated with the incoming communications;
receiving, by the network element, a communication flow that propagates through an access gateway, the communications flow being initiated by an end the end user associated with the communication flow and propagating through the network;
receiving, by the access gateway, a message indicating the end user has disconnected from or logged off the network;
generating, by the access gateway using accounting software, an accounting message indicating the termination of the communication flow associated with the end user, the accounting message further indicating an IP address assigned to the end user prior to disconnecting from or logging off the network;
receiving, by the network element from the access gateway, the accounting message indicative of the termination of the communication flow associated with the end user;
determining from the accounting message, by the network element, the IP address assigned to the first end user;
determining, by the network element, that the determined IP address of the first end user exists in an entry in a database, the entry in the database indicating the communication flow associated with the end user;
in response, removing the entry indicating the communication flow associated with the end user from the database; and
wherein the network element is operable to determine from the accounting message that the communication flow associated with the end user has terminated even though the network element does not maintain a direct connection with the end user.

13. The method of claim 12, further comprising:
providing a table on the network element that does not maintain the direct connection with the end user and through which the communication flow is propagated, wherein the table stores the IP address information associated with the end user.

14. The method of claim 12, wherein the accounting information comprises a RADIUS STOP indicator.

15. The method of claim 12, wherein the accounting information comprises a RADIUS START message.

16. The method of claim 12, wherein the accounting information comprises an IP address associated with the end user.

17. The method of claim 12, wherein the network element is further operable to:
in response to receiving the accounting information indicating that the communication flow associated with the end user has terminated, tear down a connection between the network element and a network server, the connection assigned to the communication flow associated with the end user, the connection used for propagating the communication flow through the network element to the network server.

18. The method of claim 12, further comprising:
detecting, by the network element, an event occurring at the access gateway; and
synchronizing the accounting information when the event is detected.

19. The method of claim 12, further comprising:
using the network element to monitor communications between the access gateway and a radius server;
determining from the communications between the access gateway and the radius server that a stop accounting event has occurred; and
synchronizing the accounting information maintained at the network element to reflect the stop accounting event.

20. A system for providing security in a network environment, comprising:
means for using a network element to provide security for a network, the network element inspecting incoming communications that are entering the network to determine validity prior to forwarding the incoming communications to the network, wherein the validity of the incoming communications is determined based on a shared secret received from an end user associated with the incoming communications;

means for receiving, by the network element, a communication flow that propagates through an access gateway, the communication flow being initiated by the end user associated with the communication flow and propagating through a network;

means for receiving from the access gateway accounting information, the accounting information generated by accounting software, the accounting information indicating the communication flow associated with the end user has terminated, the accounting information further indicating an IP address assigned to the end user prior to disconnecting from or logging off the network;

means for determining from the accounting information the IP address assigned to the first end user prior to disconnecting from or logging off the network;

means for determining that an entry associated with the determined IP address of the first end user prior to disconnecting from or logging off the network exists in a database;

a processor, in response to receiving the accounting information, for removing the entry associated with the determined IP address of the first end user from the database; and wherein the network element is operable to determine from the accounting information that the communication flow associated with the end user has terminated even though the network element does not maintain a direct connection with the end user.

21. The system of claim 20, further comprising:

means for providing a table on the network element that does not maintain the direct connection with the end user and through which the communication flow is propagated, wherein the table stores IP address associated with the end user.

22. The system of claim 20, wherein the accounting information comprises a RADIUS STOP indicator.

23. The system of claim 20, wherein the accounting information comprises a RADIUS START message.

24. The system of claim 20, wherein the network element is a selected one of a group of network elements, the group consisting of:

a) a firewall;
b) a switch;
c) a loadbalancer;
d) a gateway;
e) a bridge;
f) a router; and
g) a processor.

25. The system of claim 20, further comprising:

in response to receiving the accounting information indicating that the communication flow associated with the end user has terminated, means for tearing down a connection between the network element and a network server, the connection assigned to the communication flow associated with the end user, the connection used for propagating the communication flow through the network element to the network server.

26. The system of claim 20, further comprising:

means for detecting, at the network element, an event occurring at the access gateway; and means for synchronizing the accounting information when the event is detected.

27. The system of claim 20, further comprising:

means for monitoring, at the network element, communications between the access gateway and a radius server;

means for determining from the communications between the access gateway and the radius server that a stop accounting event has occurred; and means for synchronizing the accounting information maintained at the network element to reflect the stop accounting event.

28. Software for providing security in a network environment, the software being embodied in a tangible, non-transitory computer readable medium and including computer code such that when executed is operable to:

using a network element to provide security for a network, the network element inspecting incoming communications that are entering the network to determine validity prior to forwarding the incoming communications to the network, wherein the validity of the incoming communications is determined based on a shared secret received from an end user associated with the incoming communications;

receive at the network element a communication flow that propagates through an access gateway, the communication flow being initiated by the end user associated with the communication flow and propagating through the network;

receive from the access gateway accounting information, the accounting information generated by accounting software, the accounting information indicating the communication flow associated with the end user has terminated, the accounting information further indicating an IP address assigned to the end user prior to disconnecting from or logging off the network;

determine from the accounting information the IP address assigned to the first end user prior to disconnecting from or logging off the network;

determine that an entry associated with the determined IP address of the first end user prior to disconnecting from or logging off the network exists in a database;

in response, removing the entry associated with the determined IP address of the first end user from the database; and wherein the network element is operable to determine from the accounting information that the communication flow associated with the end user has terminated even though the network element does not maintain a direct connection with the end user.

29. The system of claim 20, further comprising:

means for providing a table on the network element that does not maintain the direct connection with the end user and through which the communication flow is propagated, wherein the table stores IP address associated with the end user.

30. The medium of claim 28, wherein the accounting information is a RADIUS STOP indicator.

31. The medium of claim 28, wherein the accounting information is a RADIUS START message.

32. The software of claim 28, wherein the code is further operable to:

in response to receiving the accounting information indicating that the communication flow associated with the end user has terminated, tear down a connection between the network element and a network server, the connection assigned to the communication flow associated with the end user, the connection used for propagating the communication flow through the network element to the network server.

33. The software of claim 28, wherein the code is further operable to:

detect, at the network element, an event occurring at the access gateway; and
synchronize the accounting information when the event is detected.

34. The software of claim 28, wherein the code is further operable to:
monitor, at the network element, communications between the access gateway and a radius server;
determine from the communications between the access gateway and the radius server that a stop accounting event has occurred; and
means for synchronizing the accounting information maintained at the network element to reflect the stop accounting event.

* * * * *